United States Patent
Olivier

(10) Patent No.: US 8,893,478 B2
(45) Date of Patent: Nov. 25, 2014

(54) COMPRESSOR FOR EXHAUST TREATMENT SYSTEM

(71) Applicant: Tenneco Automotive Operating Company Inc., Lake Forest, IL (US)

(72) Inventor: Keith G. Olivier, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 32 days.

(21) Appl. No.: 13/782,240

(22) Filed: Mar. 1, 2013

(65) Prior Publication Data

US 2014/0245718 A1    Sep. 4, 2014

(51) Int. Cl.
*F01N 3/00* (2006.01)
*F01N 3/10* (2006.01)
*F01N 3/02* (2006.01)
*F04B 49/00* (2006.01)
*F01N 3/023* (2006.01)
*F01N 9/00* (2006.01)

(52) U.S. Cl.
CPC ............. *F01N 9/002* (2013.01); *F01N 3/0234* (2013.01)
USPC ................... 60/286; 60/295; 60/303; 60/311; 417/223

(58) Field of Classification Search
USPC .................. 60/274, 286, 295, 297, 303, 311; 417/223, 374
See application file for complete search history.

(56) References Cited

U.S. PATENT DOCUMENTS

| 3,779,015 | A | * | 12/1973 | Maruoka | 60/286 |
| 4,604,868 | A | * | 8/1986 | Nomoto et al. | 60/286 |
| 4,927,077 | A | * | 5/1990 | Okada | 237/2 A |
| 5,243,819 | A | * | 9/1993 | Woerner et al. | 60/274 |
| 5,456,079 | A | * | 10/1995 | Langen | 60/286 |
| 6,638,027 | B2 | | 10/2003 | Mohrmann | |
| 2006/0101811 | A1 | | 5/2006 | Linna et al. | |
| 2007/0199310 | A1 | * | 8/2007 | Eybergen et al. | 60/289 |
| 2009/0255242 | A1 | | 10/2009 | Paterson et al. | |
| 2010/0158702 | A1 | * | 6/2010 | Colavincenzo | 417/16 |
| 2011/0289906 | A1 | | 12/2011 | Morley et al. | |

FOREIGN PATENT DOCUMENTS

JP   11050834 A  *  2/1999  ................ F01N 3/02
JP   2012-117454    6/2012

* cited by examiner

*Primary Examiner* — Audrey K Bradley
(74) *Attorney, Agent, or Firm* — Harness, Dickey & Pierce, P.L.C.

(57) ABSTRACT

An exhaust aftertreatment system for an engine is provided that includes a burner, an air supply system and a control module. The air supply system may be in fluid communication with the burner and may include an air compressor disposed upstream from the burner. The air compressor may include a pump mechanism, a clutch assembly selectively transferring torque from the engine to the pump mechanism, and a motor selectively driving the pump mechanism. The control module may be in communication with the clutch assembly and the motor. The control module may selectively switch the air compressor between a first operating mode in which the clutch assembly transfers torque from the engine to the pump mechanism and a second operating mode in which the motor drives the pump mechanism.

35 Claims, 3 Drawing Sheets

COMPRESSOR FOR EXHAUST TREATMENT SYSTEM

FIELD

The present disclosure relates to a system for treating exhaust gases. More particularly, a compressor for an exhaust treatment system is discussed.

BACKGROUND

This section provides background information related to the present disclosure and is not necessarily prior art.

In an attempt to reduce the quantity of $NO_x$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include one or more of a diesel particulate filter (DPF), a selective catalytic reduction (SCR) system, a hydrocarbon (HC) injector, and a diesel oxidation catalyst (DOC).

During engine operation, the DPF traps soot emitted by the engine and reduces the emission of particulate matter (PM). Over time, the DPF becomes loaded and begins to clog. Periodic regeneration or oxidation of the trapped soot in the DPF is required for proper operation. To regenerate the DPF, relatively high exhaust temperatures in combination with an ample amount of oxygen in the exhaust stream are needed to oxidize the soot trapped in the filter.

The DOC is typically used to generate heat to regenerate the soot loaded DPF. When hydrocarbons (HC) are sprayed over the DOC at or above a specific light-off temperature, the HC will oxidize. This reaction is highly exothermic and the exhaust gases are heated during light-off. The heated exhaust gases are used to regenerate the DPF.

Under many engine operating conditions, however, the exhaust gas is not hot enough to achieve a DOC light-off temperature of approximately 300° C. As such, DPF regeneration does not passively occur. Furthermore, $NO_x$ adsorbers and selective catalytic reduction systems typically require a minimum exhaust temperature to properly operate. Therefore, a burner may be provided to heat the exhaust stream upstream of the various aftertreatment devices to a suitable temperature to facilitate regeneration and efficient operation of the aftertreatment devices.

While air compressors have been associated with burners for exhaust treatment systems in the past, it may be beneficial to provide an improved air compressor to provide an appropriate amount of air flow to the burner under a variety of different engine operating conditions.

SUMMARY

This section provides a general summary of the disclosure, and is not a comprehensive disclosure of its full scope or all of its features.

In one form, the present disclosure provides an exhaust aftertreatment system that may include an exhaust passageway, an exhaust aftertreatment device, a burner, an air supply system, and a control module. The exhaust passage may receive exhaust gas from an engine. The exhaust aftertreatment device may be disposed in the exhaust passage. The burner may be in a heat transfer relationship with the exhaust gas flowing through the exhaust passage upstream of the exhaust aftertreatment device. The air supply system may be in fluid communication with the burner and may include an air compressor disposed upstream from the burner. The air compressor may include a pump mechanism, a clutch assembly selectively transferring torque from the engine to the pump mechanism, and a motor selectively driving the pump mechanism. The control module may be in communication with the clutch assembly and the motor. The control module may selectively switch the air compressor between a first operating mode in which the clutch assembly transfers torque from the engine to the pump mechanism and a second operating mode in which the motor drives the pump mechanism.

The control module may switch the air compressor between the first and second operating modes based on a demand for airflow into the burner. Additionally or alternatively, the control module may switch the air compressor between the first and second operating modes based on a comparison of a power demand of the air compressor and a threshold capacity of the motor.

In another form, the present disclosure provides a method of controlling an air compressor for an exhaust aftertreatment system that may include determining a level of demand for airflow to a burner of the exhaust aftertreatment system. A level of power needed to power the air compressor to meet the level of demand may be determined. The method may also include determining whether the level of power is above a power threshold of a motor of the air compressor. The air compressor may be switched between a motor-driven operating mode and an engine-driven operating mode based on whether the level of power is above the power threshold and/or based on engine operating conditions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
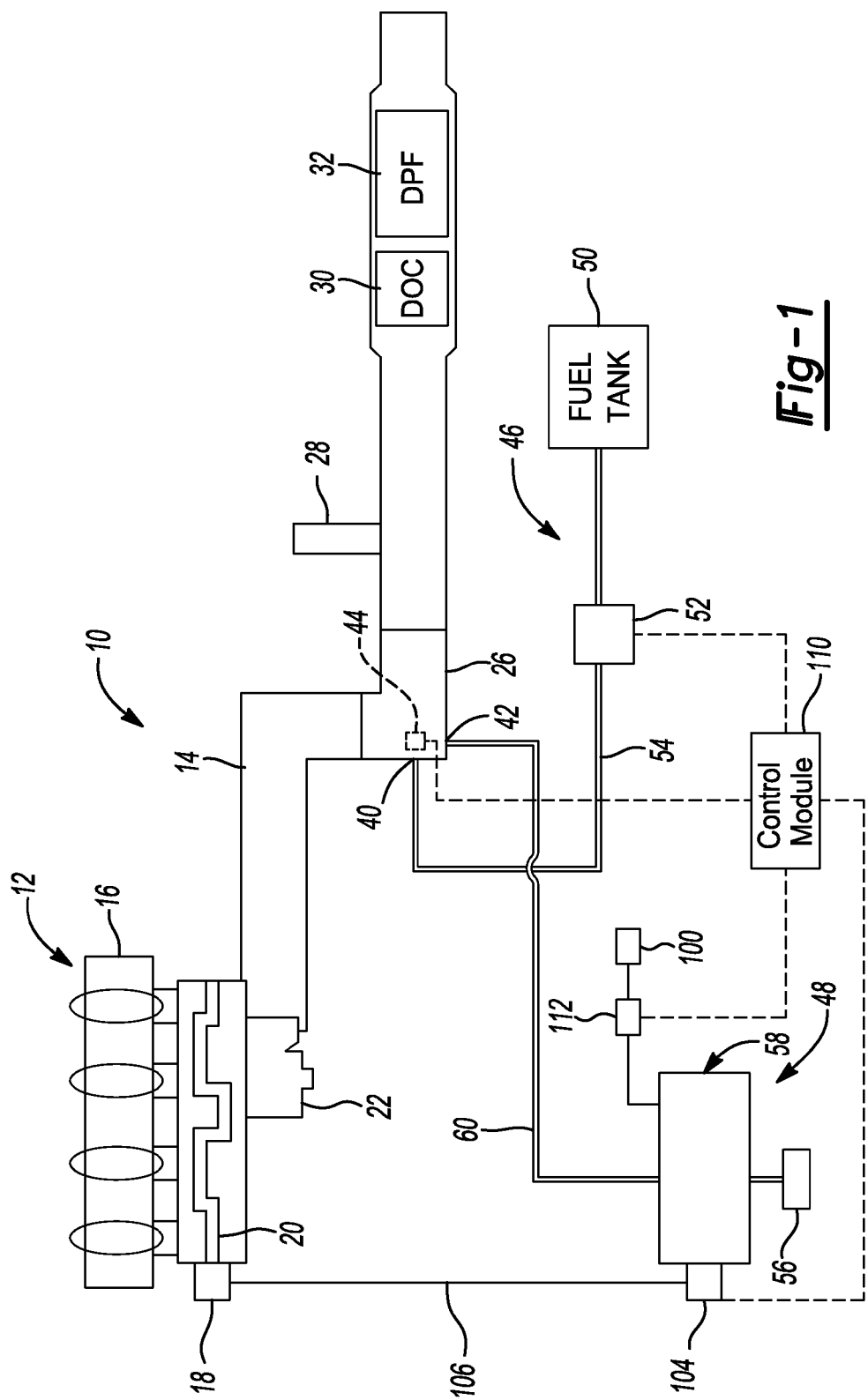
FIG. 1 is a schematic representation of an engine and exhaust aftertreatment system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 depicts an exhaust gas aftertreatment system 10 for treating the exhaust output from an exemplary engine 12 to a main exhaust passageway 14. An intake passage 16 is coupled to the engine 12 to provide combustion air thereto. A sprocket or pulley 18 may be directly or indirectly connected to a crankshaft 20 of the engine and may rotate with the crankshaft 20 during engine operation. A turbocharger 22 includes a driven member (not shown) positioned in an exhaust stream. During engine operation, the exhaust stream causes the driven member to rotate and provide compressed air to the intake passage 16 prior to entry into the engine 12. It will be appreciated that the exhaust gas aftertreatment system 10 can also be used to treat exhaust output from a naturally aspirated engine or any other engine that does not include a turbocharger.

The exhaust gas aftertreatment system 10 may include a burner 26 that receives and burns fuel from a fuel delivery system 46 and air from an air delivery system 48. The burner 26 is positioned downstream from the turbocharger 22 and upstream from a number of exhaust aftertreatment devices. The exhaust aftertreatment devices may include a hydrocarbon injector 28, a diesel oxidation catalyst 30 and/or a diesel particulate filter 32, for example.

The burner 26 may be positioned in a heat transfer relationship with exhaust gas flowing through the main exhaust passageway 14. The burner 26 may be used to heat the exhaust gas passing through the main exhaust passageway 14 to an elevated temperature that will enhance the efficiency of the DOC 30 and allow regeneration of the DPF 32. The burner 26 may also be operable to pre-heat one or more of the aftertreatment devices prior to ignition of the engine 12.

The burner 26 may include a fuel inlet 40, and air inlet 42 and an ignition device 44. The fuel inlet 40 may receive fuel (such as diesel fuel, gasoline, compressed natural gas, or ethanol, for example) from the fuel delivery system 46. The fuel delivery system 46 may include a fuel tank 50, a fuel pump 52, and a fuel supply line 54 coupled to the fuel inlet 40. The air inlet 42 may receive air from the air delivery system 48, which may include an air filter 56, an air compressor 58, and an air supply line 60 coupled to the air inlet 42. The ignition device 44 may include an injector, a nozzle, a spark plug, a glow plug and/or any other suitable device(s) operable to ignite a combination of fuel and air received from the fuel inlet 40 and the air inlet 42.

Figure 2:
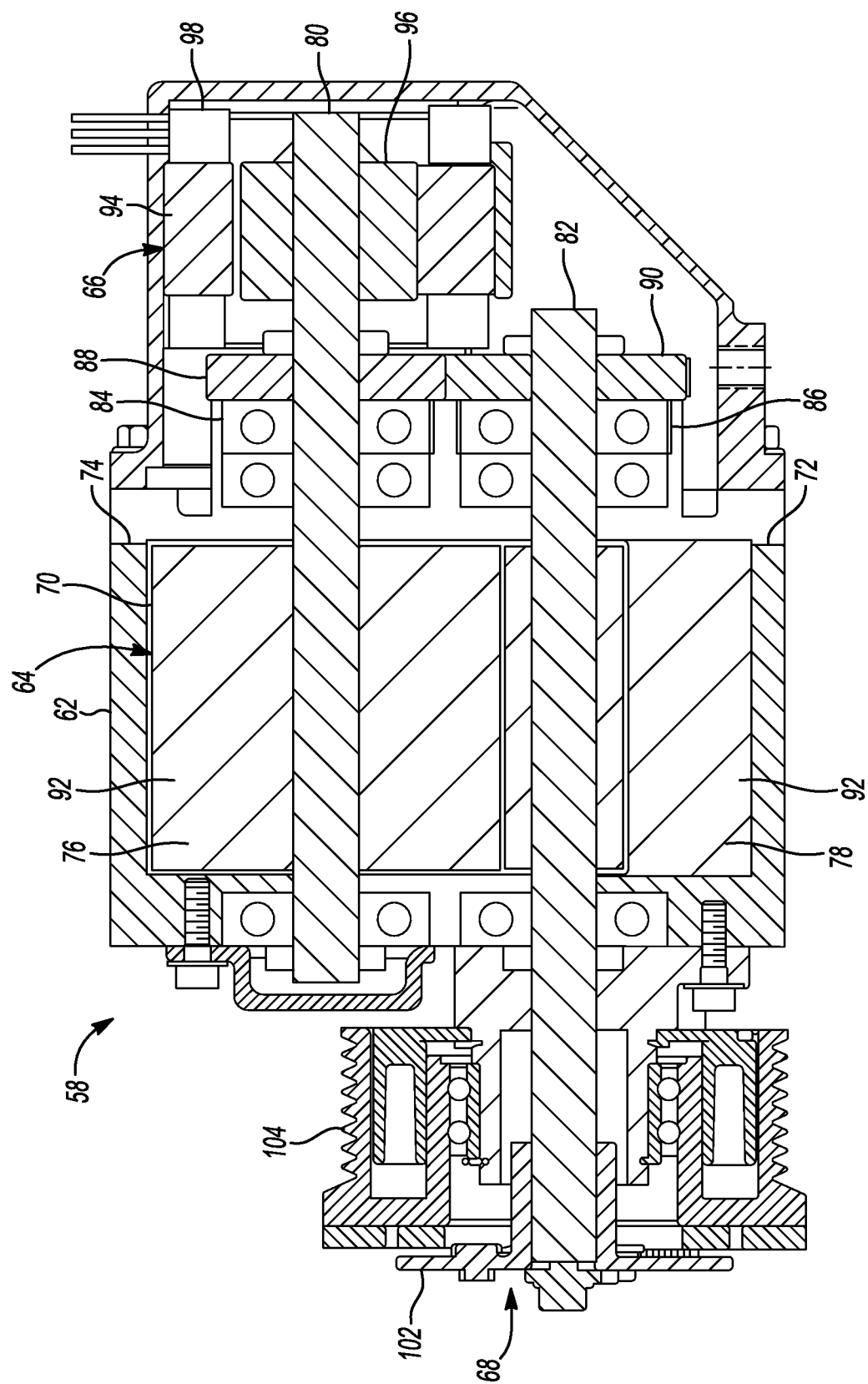
FIG. 2 is a cross-sectional view of an air compressor of the exhaust aftertreatment system of FIG. 1.

Referring now to FIG. 2, the air compressor 58 of the air delivery system 48 may include a housing 62, a pump mechanism 64, an electric motor 66 and a clutch assembly 68. The air compressor 58 is arranged as a dual-input device. That is, the pump mechanism 64 may be driven by the electric motor 66, the engine 12, or a combination of these two power sources. The pump mechanism can be any suitable type of pump, such as a roots-type positive displacement pump, a screw pump, a rotary vane pump, a scroll pump, a reciprocating pump, a centrifugal pump, or any other type of pump. The housing 62 may define a chamber 70 including an air inlet 72 and an air outlet 74. As shown in FIG. 1, the air inlet 72 may receive air from the air filter 56. The air outlet 74 may discharge air to the burner 26 via the air supply line 60.

In the particular embodiment illustrated in FIG. 2, the pump mechanism 64 includes first and second working members 76, 78, first and second shafts 80, 82, first and second bearing assemblies 84, 86, and first and second gears 88, 90. The first and second working members 76, 78 may be disposed within the chamber 70 of the housing 62 and may include a plurality of lobes 92. Rotation of the first and second working members 76, 78 relative to each other causes air to be drawn into the chamber 70 through the air inlet 72 and force air out of the chamber 70 through the air outlet 74. The first and second working members 76, 78 may be fixed to the first and second shafts 80, 82, respectively, for rotation therewith. The first and second shafts 80, 82 may be rotatably supported by the first and second bearing assemblies 84, 86, respectively. The first and second gears 88, 90 may be fixed to the first and second shafts 80, 82, respectively, and may meshingly engage each other to cause rotation of the shafts 80, 82 at the same speeds and in opposite directions.

The motor 66 may be rated for operation up to a predetermined power threshold (e.g., a maximum power output or capacity). This threshold could be between about 1-1.5 kilowatts, for example. The motor 66 may be disposed within the housing 62 and may include a stator 94 and a rotor 96. The stator 94 may be fixed relative to the housing 62 and may surround the rotor 96. The rotor 96 may be fixed to the first shaft 80. The stator 94 may include windings 98 in electrical communication with a battery 100, a fuel cell and/or another electrical-energy-storage device. The motor 66 may include an inverter or a variable-frequency drive to achieve a wide range of speeds and power. When the windings 98 receive electrical current, the rotor 96 rotates relative to the stator 94, thereby causing the first shaft 80 to rotate relative to the housing 62. As described above, rotation of the one of the first and second shafts 80, 82 causes corresponding rotation of the other of the first and second shafts 80, 82 due to the engagement between the first and second gears 88, 90.

The clutch assembly 68 may be of any suitable type or configuration. In the embodiment depicted in FIG. 2, the clutch assembly 68 may include a friction plate 102 and a pulley 104. The friction plate 102 may be rotationally fixed to the second shaft 82, yet axially movable relative to the second shaft 82 and the pulley 104. The clutch assembly 68 may include a solenoid or other electromechanical actuator operable to move the friction plate axially relative to the pulley 104 between first and second positions. In the first position, the friction plate 102 may engage the pulley 104 to rotationally fix the pulley 104 relative to the friction plate 102 and the second shaft 82. In the second position, the friction plate 102 may disengage the pulley 104 to rotationally decouple the pulley 104 from the friction plate 102 and the second shaft 82 such that the second pulley 104 and the second shaft 82 are free to rotate independently of each other.

The pulley 104 may be coupled to the pulley 18 (which is connected to the crankshaft 20 of the engine 12, as shown in FIG. 1) via a belt 106 or chain, for example. In this manner, operation of the engine 12 causes rotation of the pulley 104 at a speed that is proportional to the rotational speed of the crankshaft 20 of the engine 12. That is, when the crankshaft 20 is rotating at a relatively low speed (e.g., during idling or low-load operating conditions), the pulley 104 may rotate at a relatively low speed. Conversely, when the crankshaft 20 is rotating at a relatively high speed (e.g., during acceleration or high-load operating conditions), the pulley 104 may rotate at a relatively high speed. Accordingly, when the friction plate 102 is engaging the pulley 104, rotary motion of the crankshaft 20 is transmitted to the second shaft 82 to operate the pump mechanism 64.

A control module 110 (FIG. 1) is provided to monitor and control the flows of fuel and air through the fuel delivery system 46 and air delivery system 48, respectively. The control module 110 may also monitor and control operation of the ignition device 44. The control module 110 may include or be part of an Application Specific Integrated Circuit (ASIC), an electronic circuit, a processor (shared, dedicated or group) and/or memory (shared, dedicated or group) that execute one or more software or firmware programs, a combinational logic circuit and/or other suitable components that provide the described functionality. The control module 110 may be a part of or include a control unit controlling one or more other vehicle systems. Alternatively, the control module 110 may be a control unit dedicated to the exhaust gas aftertreatment system 10.

As shown in FIG. 1, the control module 110 may be in communication with and control operation of the ignition device 44, the fuel pump 52, the motor 66 (via a motor drive unit 112) and the clutch assembly 68. The control module 110 may also monitor operating conditions of the engine 12, the burner 26, and/or one or more of the aftertreatment devices 28, 30, 32. Based on such operating conditions, the control module 110 may determine whether the air compressor 58 should be operated, at what speed or output capacity the air compressor 58 should be operated, and whether the pump mechanism 64 should be driven by the motor 66 or by the crankshaft 20 via the belt 106 and pulley 104.

The motor 66 of the air compressor 58 may be designed to operate the pump mechanism 64 during periods of relatively low demand for airflow to the burner 26. When the exhaust gas aftertreatment system 10 demands a relatively large amount of airflow to the burner 26 (i.e., an amount which requires more power to run the pump mechanism 64 that the motor 66 can effectively or efficiently produce), the control module 110 may cause the motor 66 to shut down and cause the clutch assembly 68 to rotationally couple the pulley 104 with the second shaft 82 so that the engine 12 can drive the pump mechanism 64.

Figure 3:
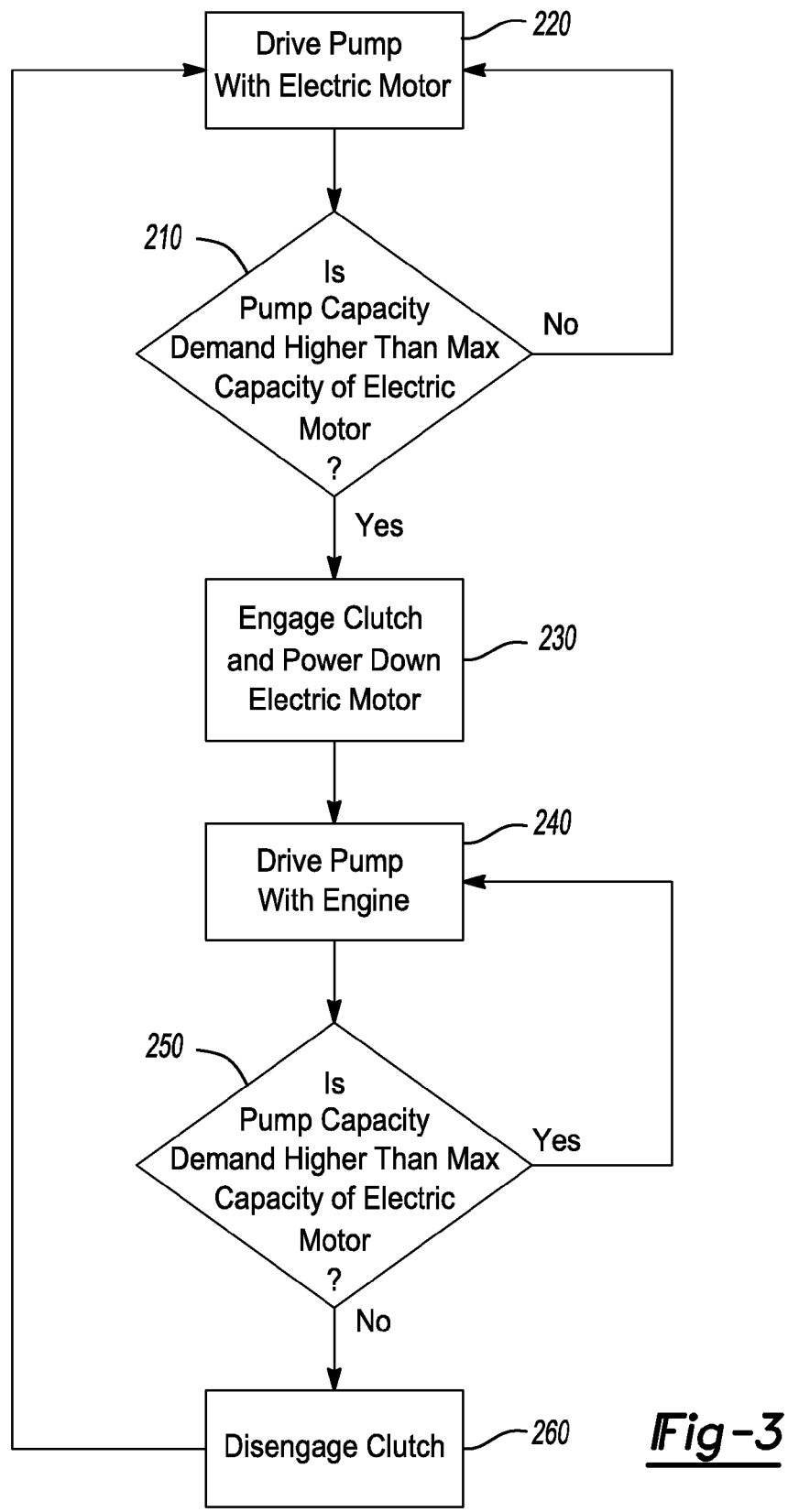
FIG. 3 is a flow chart illustrating a method of operating the air compressor.

FIG. 3 illustrates an exemplary method of operating the air compressor 58. At step 210, the control module 110 may determine, based on operating conditions of the engine 12 and/or the exhaust gas aftertreatment system 10, whether an amount of airflow to the burner 26 is needed that requires the air compressor 58 to be operated with more power than the threshold power of the motor 66. If, the demand is below the threshold, the control module 110 may, at step 220, cause the motor 66 to drive the pump mechanism 64 to supply air to the burner 26. For example, the burner 26 may only need a relatively low amount of airflow under one or more of the following conditions: (1) when the engine 12 is idling or operating at relatively low engine-speeds with relatively low load; (2) during ignition of the burner 26 prior to start-up of the engine to pre-heat the aftertreatment devices; (3) between ignition events in the burner 26 to keep a small amount of air flowing through the burner 26 to reduce or prevent exhaust gas from entering the burner 26 and to reduce or prevent accumulation of fuel residue and combustion byproducts on components of the burner 26. It will be appreciated that relatively low airflow demand may be desirable or may be sufficient under additional or alternative operating conditions.

When engine operating conditions create a demand for a relatively large amount of airflow to the burner 26 (such as, for example, when the engine 12 is operating at relatively high speeds and/or under relatively high loads), the control module 110 may, at step 230, shutdown the motor 66 and engage the clutch assembly 68. In some embodiments, before the motor 66 is shutdown and before the clutch assembly 68 is engaged, the control module 110 may adjust the speed of the motor 66 so that the first and second shafts 80, 82 are rotating at the same speed (or close to the same speed) as the belt 106 and pulley 104. Once these speeds are matched or nearly matched, the control module may engage the clutch assembly 68 and shutdown the motor 66. This may decrease wear on the clutch assembly 68 and reduce the driver's ability to perceive the change in load on the engine 12. At step 240, engagement of the clutch assembly 68 causes the pump mechanism 64 to be driven by the engine 12 via the belt 106 and pulley 104.

At step 250, the control module 110 may evaluate whether demand on the air compressor 58 is higher than the threshold operating capacity of the motor 66. If the demand is higher than the threshold capacity, the control module 110 may maintain the clutch assembly 68 in the engaged position to continue driving the pump mechanism 64 with the engine 12. When demand on the air compressor 58 drops to a level that is within the capacity threshold of the motor 66, the control module 110 may disengage the clutch assembly 68 at step 260 and power-up the motor 66 to drive the pump mechanism 64 with the motor 66 at step 220.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust aftertreatment system comprising:
an exhaust passage receiving exhaust gas from an engine;
an exhaust aftertreatment device disposed in the exhaust passage;
a burner in a heat transfer relationship with the exhaust gas flowing through the exhaust passage upstream of the exhaust aftertreatment device;
an air supply system in fluid communication with the burner and including an air compressor disposed upstream from the burner, the air compressor including a pump mechanism, a clutch assembly selectively transferring torque from the engine to the pump mechanism, and a motor selectively driving the pump mechanism; and
an electronic circuit in communication with the clutch assembly and the motor, the electronic circuit selectively switching the air compressor between a first operating mode in which the clutch assembly transfers torque from the engine to the pump mechanism and a second operating mode in which the motor drives the pump mechanism based on a comparison of a power demand of the air compressor and a predetermined capacity threshold of the motor.

2. The exhaust aftertreatment system of claim 1, wherein the air compressor is operable in the second operating mode while the engine is operating.

3. The exhaust aftertreatment system of claim 1, wherein the clutch assembly includes a pulley coupled to the engine by a belt.

4. The exhaust aftertreatment system of claim 1, wherein the motor is powered down in the first operating mode.

5. The exhaust aftertreatment system of claim 1, wherein the clutch assembly decouples the engine from the pump mechanism in the second operating mode.

6. The exhaust aftertreatment system of claim 1, wherein the engine drives a first working member of the pump mechanism in the first operating mode and the motor drives a second working member of the pump mechanism in the second operating mode.

7. The exhaust aftertreatment system of claim 1, wherein the electronic circuit operates the air compressor in the second mode while the engine is idling.

8. The exhaust aftertreatment system of claim 1, wherein the electronic circuit operates the air compressor in the second mode while the burner is in an off-mode in which combustion within the burner is ceased.

9. The exhaust aftertreatment system of claim 1, wherein the electronic circuit operates the air compressor in the second mode for a predetermined amount of time after vehicle shutdown.

10. The exhaust aftertreatment system of claim 1, wherein the electronic circuit operates the air compressor in the second mode prior to a cold-start of the engine.

11. The exhaust aftertreatment system of claim 1, wherein the electronic circuit includes at least one of a processor, an application specific integrated circuit and a combinational logic circuit.

12. The exhaust aftertreatment system of claim 1, wherein the power demand of the air compressor is based on an operating condition of a vehicle.

13. The exhaust aftertreatment system of claim 12, wherein the power demand of the air compressor is based on an operating condition of the exhaust aftertreatment device.

14. The exhaust aftertreatment system of claim 1, wherein the motor is a dedicated compressor motor.

15. The exhaust aftertreatment system of claim 14, wherein the motor is disposed within a housing of the compressor.

16. The exhaust aftertreatment system of claim 14, wherein the motor includes a stator surrounding at least a portion of a shaft of the pump mechanism.

17. An exhaust aftertreatment system comprising:
an exhaust passage receiving exhaust gas from an engine;
an exhaust aftertreatment device disposed in the exhaust passage;
a burner in a heat transfer relationship with the exhaust gas flowing through the exhaust passage upstream of the exhaust aftertreatment device;
an air supply system in fluid communication with the burner and including an air compressor disposed upstream from the burner, the air compressor including a pump mechanism, a clutch assembly selectively transferring torque from the engine to the pump mechanism, and a motor selectively driving the pump mechanism; and
an electronic circuit in communication with the clutch assembly and the motor, the electronic circuit selectively switching the air compressor between a first operating mode in which the clutch assembly transfers torque from the engine to the pump mechanism and a second operating mode in which the motor drives the pump mechanism based on a demand for airflow into the burner, wherein the electronic circuit switches the air compressor between the first and second operating modes based on a comparison of a power demand of the air compressor and a threshold capacity of the motor.

18. The exhaust aftertreatment system of claim 12, wherein the demand for airflow into the burner is based on an operating condition of the engine.

19. The exhaust aftertreatment system of claim 17, wherein the air compressor is operable in the second operating mode while the engine is operating.

20. The exhaust aftertreatment system of claim 17, wherein the clutch assembly includes a pulley coupled to the engine by a belt.

21. The exhaust aftertreatment system of claim 17, wherein the motor is powered down in the first operating mode.

22. The exhaust aftertreatment system of claim 17, wherein the clutch assembly decouples the engine from the pump mechanism in the second operating mode.

23. The exhaust aftertreatment system of claim 17, wherein the engine drives a first working member of the pump mechanism in the first operating mode and the motor drives a second working member of the pump mechanism in the second operating mode.

24. The exhaust aftertreatment system of claim 17, wherein the electronic circuit operates the air compressor in the second mode while the engine is idling.

25. The exhaust aftertreatment system of claim 17, wherein the electronic circuit operates the air compressor in the second mode while the burner is in an off-mode in which combustion within the burner is ceased.

26. The exhaust aftertreatment system of claim 17, wherein the electronic circuit operates the air compressor in the second mode for a predetermined amount of time after vehicle shutdown.

27. The exhaust aftertreatment system of claim 17, wherein the electronic circuit operates the air compressor in the second mode prior to a cold-start of the engine.

28. The exhaust aftertreatment system of claim 1, wherein the electronic circuit includes at least one of a processor, an application specific integrated circuit and a combinational logic circuit.

29. The exhaust aftertreatment system of claim 17, wherein the motor is a dedicated compressor motor.

30. The exhaust aftertreatment system of claim 29, wherein the motor is disposed within a housing of the compressor.

31. The exhaust aftertreatment system of claim 29, wherein the motor includes a stator surrounding at least a portion of a shaft of the pump mechanism.

32. A method of controlling an air compressor for an exhaust aftertreatment system comprising:
    determining a level of demand for airflow to a burner of the exhaust aftertreatment system;
    determining a level of power needed to power the air compressor to meet the level of demand;
    determining whether the level of power is above a power threshold of a motor of the air compressor; and
    switching the air compressor between a motor-driven operating mode and an engine-driven operating mode based on whether the level of power is above the power threshold.

33. The method of claim 32, wherein switching the air compressor between the motor-driven operating mode and the engine-driven operating mode includes driving the motor at a speed that corresponds to a speed of the engine before engaging a clutch assembly and shutting down the motor.

34. The method of claim 32, wherein the level of demand for airflow to the burner is determined based on an operating condition of vehicle in which the aftertreatment system is installed.

35. The method of claim 32, wherein the operating condition includes engine speed.

* * * * *